United States Patent [19]
Koeppen

[11] 3,805,909
[45] Apr. 23, 1974

[54] AUTOMOTIVE VEHICLE PARTICULARLY SELF-PROPELLED WORKING MACHINE OR FARM TRACTOR

[75] Inventor: Rudolf Koeppen, Monchengladbach, Germany

[73] Assignee: International Harvester Company, Chicago, Ill.

[22] Filed: Oct. 13, 1972

[21] Appl. No.: 297,509

[30] Foreign Application Priority Data
Oct. 20, 1971 Germany............................ 2152294

[52] U.S. Cl................................................ 180/69 C
[51] Int. Cl............................................... B62d 25/10
[58] Field of Search..... 180/69 C, 69 R, 68 R, 68 P, 180/54 A, 54 F; 296/76

[56] References Cited
UNITED STATES PATENTS
2,199,317  4/1940  Klavik................................ 180/54 A
1,167,571  1/1916  Karow................................ 180/68 R
2,041,522  5/1936  Breer.................................. 180/69 C FOREIGN PATENTS OR APPLICATIONS
1,141,581  1/1969  Great Britain..................... 180/69 C Primary Examiner—David Schonberg
Assistant Examiner—Milton L. Smith
Attorney, Agent, or Firm—Ronald A. Kamp; Floyd B. Harman

[57] ABSTRACT

A tiltable hood and radiator grille mechanism having bracket means pivotally carried by the vehicle and secured to the hood. A pivot means permits the grille to pivot at its lower edge about a horizontal axis and resilient means are connected between the bracket means on the upper portion of the grille for coordinating pivoting of the grille in response to pivoting the hood.

4 Claims, 1 Drawing Figure

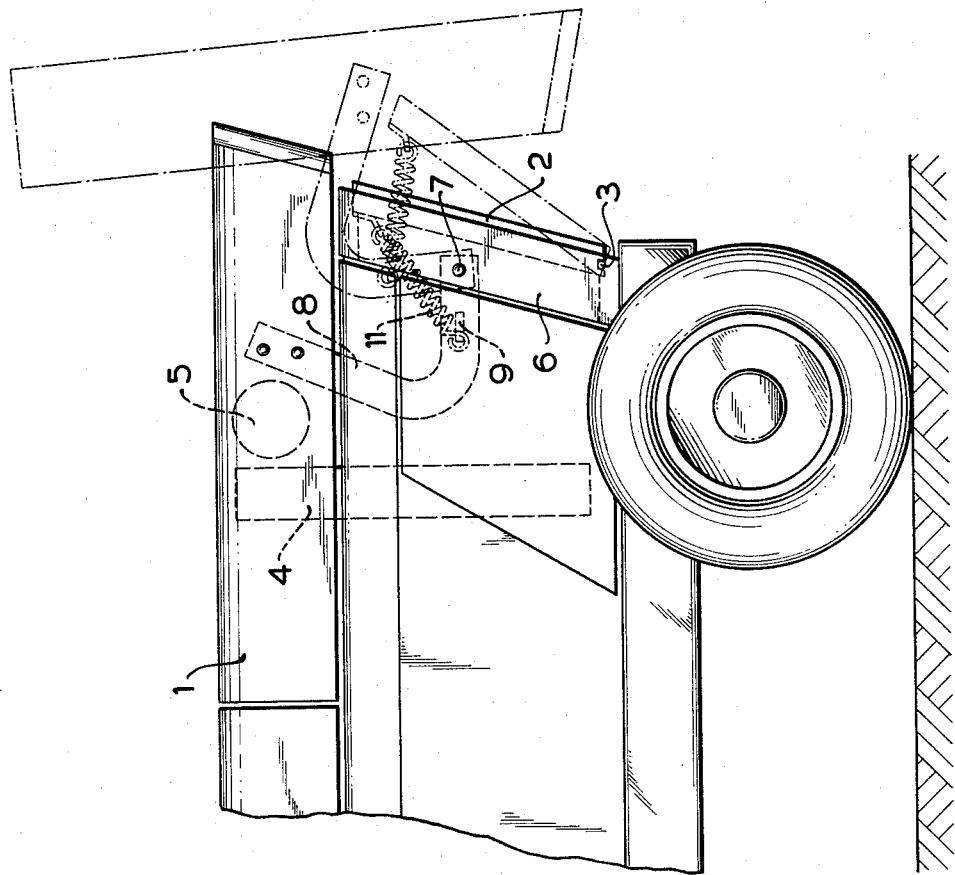

AUTOMOTIVE VEHICLE PARTICULARLY SELF-PROPELLED WORKING MACHINE OR FARM TRACTOR

The invention relates to an automotive vehicle, particularly to a self-propelled working machine or farm tractor featuring a tiltable engine hood and a swivel-type spring-biased radiator grille.

As regards grilles arranged at the sides of a farm tractor, it is a known feature to apply cams for supporting the grille at its lower edge and for swivelling the same whereas the upper portion is pulled into the grille frame of the cowling by means of springs. Such grilles may be released without the application of tools, i.e., they can be opened. This opening is necessary to be able to carry out an exact cleaning of the grille's surface. On the other hand, however, the opening of the known grilles feature a disadvantage because the grille screen is to be pulled out of the grille frame by hand against the spring force so that the operator can only use one hand for cleaning the grille surface. It is indeed possible to fully take the grilles out of the frame. In this case, however, the grille is also to be held with one hand to keep the screen, loosely attached to the spring, clear from the finish of the cowling which otherwise would suffer damage. A particularly heavy damage of the finish would above all occur during the harvest season because a daily cleaning of the air suction space of the tractor by means of compressed air or water jetting is imperative.

Due to DOS No. 1,655,570 an arrangement of engine accessory components has become known on automotive vehicles and self-propelled working machines, particularly on tractors, characterized in that the radiator grille is tiltable at the front end of the tractor as well as the engine hood that can likewise be swung out independently thereof. But in this case, too, the above described disadvantages arise. The object of the invention is to create an automotive vehicle, particularly a self-propelled working machine or a farm tractor of the kind mentioned at the outset of the present specification on which the radiator grille may easily be swung in or out without the application of tools in such a way that it can be kept in the swung-out position without any particular manipulation. According to the invention this is achieved by a mechanism that transfers the tilting movement of the engine hood to the radiator grille. This mechanism is designed such that, when opening the engine hood, the radiator grille is consequently also brought to the position open. In that opened position the radiator grille is held via the connecting mechanism on account of the relatively heavy engine hood so that the operator has both hands free for cleaning the air suction space. Vice versa, the radiator grille is automatically returned to its locked position if the engine hood is closed.

An appropriate design of the present invention is that one end of the transfer mechanism is mounted to the engine hood and the other end to a swivel-type section located around an essentially horizontal axis whereby the radiator grille spring acts on that section. The transfer mechanism can particularly easily be kept in its position if the section consists of latches extending on both sides of the engine space and of a strut associating these latches.

A spaciously favourable solution is achieved if, according to a further feature of the present invention, the latches are L-shaped and mounted to the front portion of the engine hood.

Concerning the embodiment represented on the drawing, the front portion of a farm tractor is shown with a tiltable engine hood 1 and a swivel-type radiator grille 2. The swivelling action of the radiator grille 2 is obtained by lower cams or pivot means 3 around which the radiator grille 2 can move frontwards to a restricted extent. The front portion of the tractor furthermore accommodates a radiator 4 and a filter 5 which have to be cleaned from time to time in addition to other tractor components. To enable that it is necessary to swing out both the engine hood 1 and the radiator grille 2 as it has been featured by dot-dash lines. According to the invention, the swinging movements of engine hood 1 and of radiator grille 2 are compulsorily coupled with one another. This is achieved by a mechanism which essentially consists of a section or bracket 8, pivotally mounted around a horizontal axis 7 within the area of grille frame 6 one end of which is mounted to the engine hood 1. The swivelling section 8 is constituted by two essentially L-shaped latches extending on both sides of the engine space which are connected with one another by means of a strut 9. An extension spring 11 acts on this strut 9, the other end of that spring being mounted to the upper end of radiator grille 2.

If the engine hood 1 is to be opened for the purpose of maintenance or cleaning, it is tilted upwards and frontwards subsequent to having loosened the corresponding arresting means. As there exists positive connection with radiator grille 2 over the section 8, the radiator grille 2 is automatically tilted frontwards when swinging up the engine hood 1. As a consequence, the entire air suction space is free for cleaning. When tilting back the engine hood 1, the radiator grille 2 is automatically brought back to its closed position.

The invention is not only restricted to the embodiment shown, but it also allows modifications to be made within the scope of the claims. Thus, for example, the swivelling section may easily be mounted to within the rear portion of the engine hood. In every case, however, it is essential that the mounting end of the radiator grille spring is attached to a portion which can jointly be swung out with the engine hood 1. Due to mounting the spring to a locally movable spot it is ensured that the opening and closing movement of the grille always corresponds to or coincides with that of the engine hood 1.

What is claimed is:

1. In a vehicle having a hood and a radiator grille, each of which has an operative position, the improvement comprising:
   bracket means pivotally carried by the vehicle and secured to said hood;
   pivot means for permitting said grille to pivot at its lower edge about a horizontal axis; and
   resilient means connected between said bracket means and the upper portion of said grille;
   whereby raising said hood from its operative position permits said grille to pivot outward from its operative position and lowering said hood to its operative position causes the resilient means to urge said grille into its operative position.

2. The invention according to claim 1, wherein said resilient means comprises a coil spring.

3. The invention according to claim 1 wherein said bracket means comprises:

a pair of substantially L-shaped members, laterally spaced on each side of the longitudinal centerline of the vehicle;
one end of each member secured to said hood and the other end pivotally carried by the vehicle.

4. The invention according to claim 3, and further comprising:
a coil spring extending between said grille and each of said members.

* * * * *